United States Patent [19]

Ishizuka

[11] Patent Number: 4,615,275

[45] Date of Patent: Oct. 7, 1986

[54] EMERGENCY EXIT APPARATUS

[75] Inventor: Masashi Ishizuka, Kobe, Japan

[73] Assignee: Kawasaki Jukogyo Kabushiki Kaisha, Kobe, Japan

[21] Appl. No.: 672,920

[22] Filed: Nov. 19, 1984

[30] Foreign Application Priority Data

Nov. 22, 1983 [JP] Japan ................. 58-220182

[51] Int. Cl.[4] ............ B61D 19/00; B61D 23/00; B60R 3/02

[52] U.S. Cl. .................. 105/438; 105/348; 105/447; 182/78; 280/164 R

[58] Field of Search ........... 14/69.5; 105/348, 349, 105/431, 436, 437, 438, 443, 447, 448; 160/89, 92, 181, 182; 182/77, 78, 97; 280/163, 164 R; 296/146

[56] References Cited

U.S. PATENT DOCUMENTS

| | | | |
|---|---|---|---|
| 1,387,134 | 8/1921 | Dufek | 105/436 |
| 2,453,937 | 11/1948 | Ray | 105/447 X |
| 3,213,962 | 10/1965 | Clark, Jr. | 182/78 |
| 3,861,739 | 1/1975 | Kinney | 296/146 |
| 4,216,725 | 8/1980 | Hallum | 105/348 |

FOREIGN PATENT DOCUMENTS

| | | |
|---|---|---|
| 150383 | 6/1902 | Fed. Rep. of Germany . |
| 2142787 | 2/1973 | France . |
| 2001598 | 2/1979 | United Kingdom . |

*Primary Examiner*—Robert B. Reeves
*Assistant Examiner*—David F. Hubbuch
*Attorney, Agent, or Firm*—Leydig, Voit & Mayer, Ltd.

[57] ABSTRACT

There is provided an emergency exit apparatus disposed on a wall surface of a train car. A hinged door assembly comprises a hinged door portal frame and a hinged door carrying a stair on its inner surface. In one embodiment, the lower edge of the hinged door portal frame is coupled to a wall surface by a horizontal hinge, while the hinged door is coupled to the hinged door portal frame by a vertical hinge. In a second embodiment, the side edge of the portal frame is coupled to a wall surface by a vertical hinge, while the hinged door is coupled to the portal frame by a horizontal hinge. When swung open on the horizontal hinge, the inner surface of the door provides a ramp for emergency exit; when swung open on the vertical hinge, the portal frame including the door provides an opening for normal entrance and exit.

1 Claim, 10 Drawing Figures

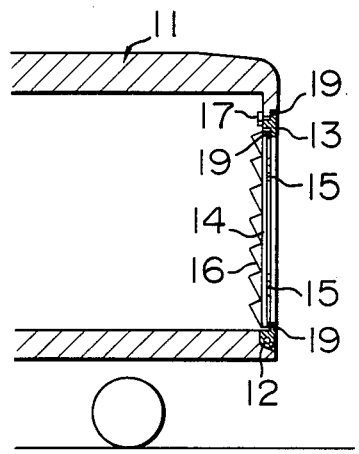
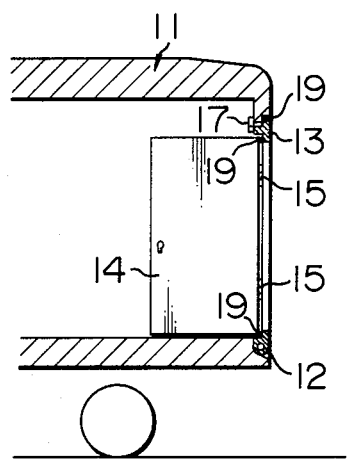
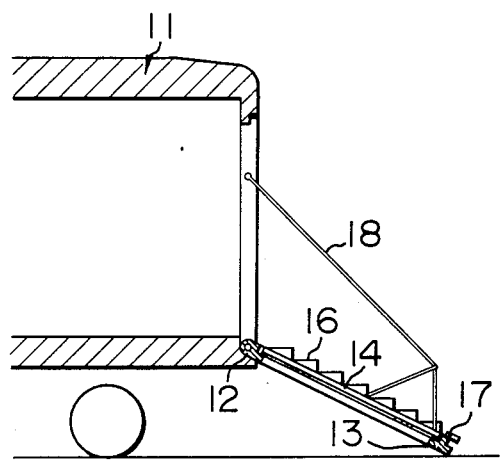

EMERGENCY EXIT APPARATUS

FIELD OF THE INVENTION

The present invention relates to an emergency exit apparatus provided at the head of a train car, particularly a subway or elevated train car, to allow the passengers to exit therefrom in an emergency where it is impossible for the passengers to escape sideways through the entrance/exit doors provided on both sides of the car such as in an enclosed tunnel structure or on a narrow track.

BACKGROUND OF THE INVENTION

As an emergency exit apparatus at the head of a car, there are generally known a type in which a hinged door 1 is opened and a ladder 2 is lowered, as is shown in FIG. 1, and a type in which a hinged door 3 falls outwardly with its lower edge being axially supported by a support 4 and the inner surface of the hinged door 3 is used as an emergency staircase, as shown in FIG. 2.

In the former case, when cars are linked together, it is possible for the opening made by the hinged door 1 to perform the function of a through passage. As an apparatus for stepping down to the track, however, it is only possible for a simple ladder or something of that sort to be installed because of the problem of space, etc. Furthermore, in order for this type of apparatus to perform as a through passage, it is necessary to constantly store the ladder at a separate place. Consequently, there is no guarantee that this type of ladder will be effectively used in the sort of panic often occurring during an emergency. Hence, this type of emergency exit apparatus has disadvantages in terms of time required for installation and safety at the time of escaping to the track.

In the latter case, on the other hand, the apparatus can be constructed with the inner surface of the hinged door as a stepping board, which can be made into a rigidly constructed staircase or slope as an apparatus for stepping down to the track. However, there is a drawback in that the apparatus cannot be used as a through passage when cars are linked together.

SUMMARY OF THE INVENTION

The present invention was disclosed in view of the aforementioned drawbacks, and an object of the invention is to provide an emergency exit apparatus that will overcome the shortcomings of the prior art by providing a door which can be used as a through passage for normal movement between cars, and which will, when placed at the head of a train, also serve as an emergency exit staircase, permitting the passengers to step down to the track safely and quickly.

According to this invention, a hinged door portal frame which is pivotally supported on a horizontal axis at its lower edge and swings open outwardly is provided on a wall surface of the structure from which people make entry or exit. The hinged door portal frame is provided with a hinged door which is pivotally supported on a vertical axis for opening inwardly and outwardly. The inner surface of the hinged door carries a series of steps which will form a staircase or slope when the hinged door portal frame, together with the hinged door, is swung open. An alternative apparatus according to the present invention provides a hinged door portal frame which is pivotally supported as a vertical axis and is inwardly and outwardly openable for people to make normal entry or exit, and a hinged door which swings open outwardly with its lower edge being pivotally supported on the inner side of the hinged door portal frame for people to make emergence exit. The emergency exit door carries on its inner surface a staircase useable when the hinged door is swung open outwardly.

The above-mentioned objects along with other features and advantages will become apparent to those skilled in the art with reference to the following drawings in which:

BRIEF DESCRIPTION OF THE DRAWINGS

FIGS. 3 to 7, inclusive, show an embodiment of the invention described in claim 1, in which FIG. 3 is a cross-sectional view of the essential parts;

FIG. 4 is an explanatory drawing of said embodiment used as a through passage;

FIG. 5 is an explanatory drawing of said embodiment used as an emergency exit apparatus;

FIG. 6 is a perspective view illustrating a specific example of the state of the through passage; and FIG. 7 is a perspective view illustrating a specific example of the state of the emergency exit apparatus;

FIGS. 8 to 10, inclusive, show an embodiment of the invention described in claim 2, in which FIG. 8 is a cross-sectional view of the essential parts of the emergency exit apparatus;

FIG. 9 is an explanatory drawing of said apparatus being used as a through passage;

FIG. 10 is an explanatory drawing of the said apparatus being used as an emergency exit.

DETAILED DESCRIPTION OF THE PREFERRED EMBODIMENTS

Figure 1:
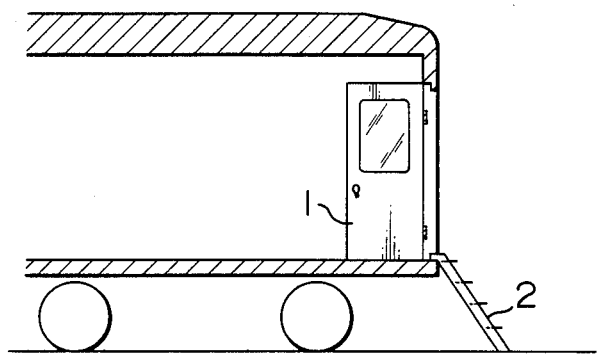
FIG. 1 is a cross-sectional view of a conventional emergency exit which also serves as a through passage.
Figure 2:
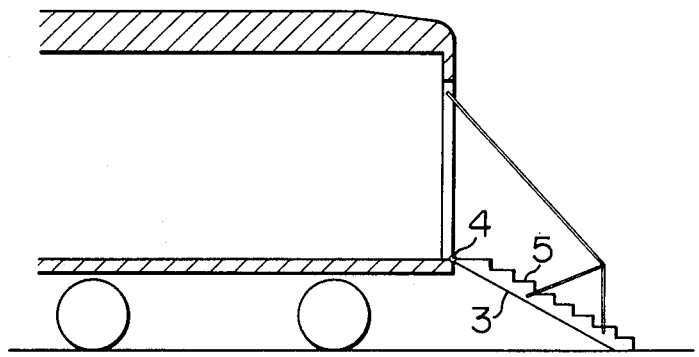
FIG. 2 is a cross-sectional view of a conventional emergency exit of the outwardly-opening type.

Referring next to FIGS. 3 to 10, preferred embodiments of the present invention will be described in detail. FIGS. 3 to 7, inclusive, show a first embodiment of the invention. Likewise, FIGS. 8 to 10, inclusive, show a second preferred embodiment of the invention. First, description will be made of the first preferred embodiment of the invention with reference to FIGS. 3 to 7. As shown in FIG. 3, a hinged door portal frame 13 (one component) with its lower edge pivotally supported by means of a horizontal shaft 12 is openably installed in a through passage for communication formed at the end of a car body 11, so that the hinged door portal frame 13 will swing open outwardly. Additionally, a hinged door 14 (a second component) is installed on the inner side of this hinged door portal frame 13 in such a way that the hinged door 14 will open inwardly or outwardly by means of a vertically arranged hinge structure 15. Furthermore, stepping means such as a staircase 16 or a slip-proof platform is installed on the inner room-side of the hinged door 14, so that people can walk safely on it. A locking device 17 locks the hinged door portal frame 13 to the car body 11.

In cases in which the car is disposed midway within the length of a train, the apparatus can be used as a through passage by leaving the hinged door frame 13 locked onto the car body 11 by means of the locking device 17 and making only the hinged door 14 openable, as shown in FIG. 4.

On the other hand, in cases in which the car is disposed at the head of a train and the apparatus is used as an emergency exit, the inner surface of the hinged door 14 serves as a staircase or ramp so as to form an emergency exit passage. This is effected by releasing the lock of the locking device 17 and pushing down outwardly the hinged door portal frame 13 together with the hinged door 14. At this juncture, safety can be further improved if a lifting rope 18 is connected between the car body 11 and the hinged door portal frame 13 and is used as a railing.

Figure 6:
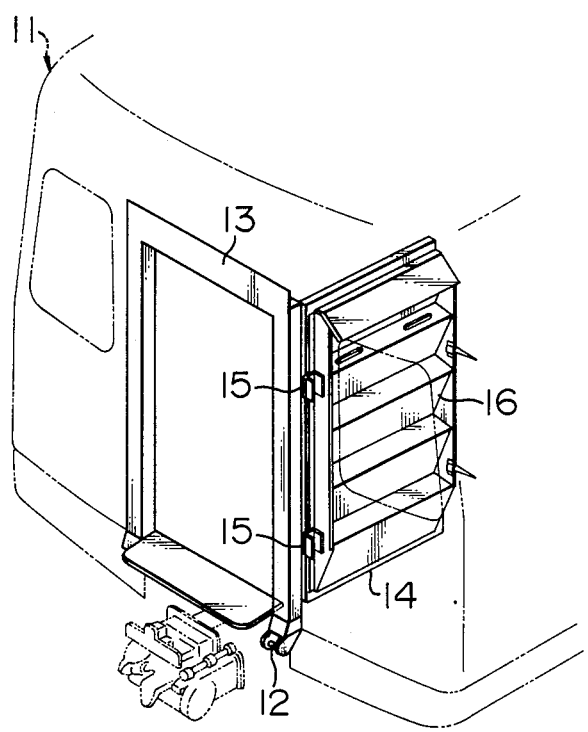
Figure 7:
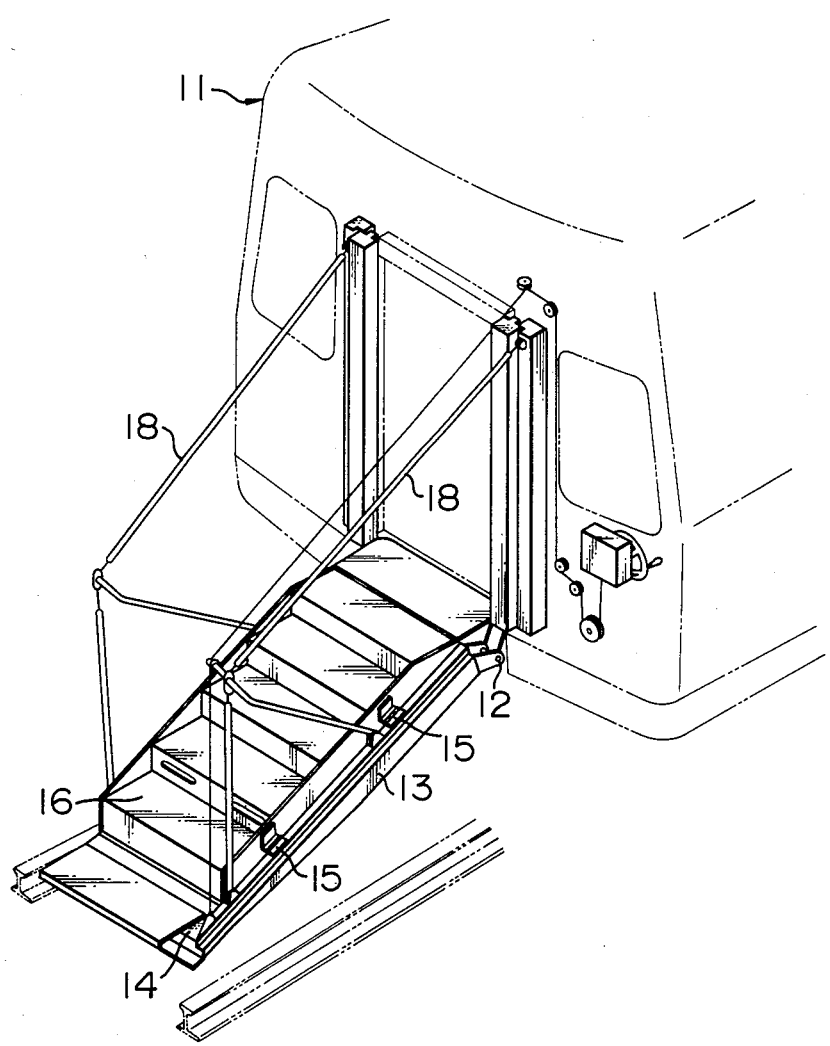

The cross-sectional configuration of the hinged door portal frame 13 is T shape, a sealing rubber 19 is interposed between the hinged door portal frame 13 and the hinged door 14 and between the hinged door portal frame 13 and the car body 11, respectively, so as to prevent the entry of rain water or wind. FIGS. 6 and 7 show specific examples of the aforementioned preferred embodiment.

Figure 8:
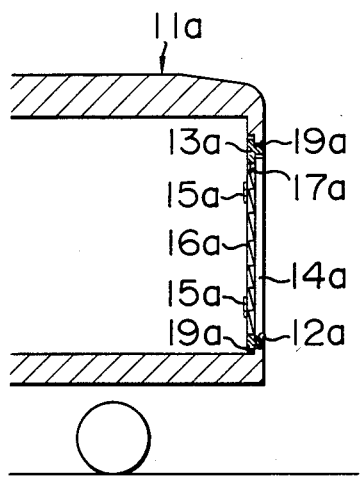
Figure 9:
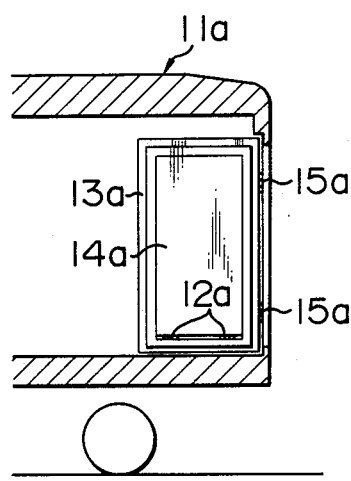
Figure 10:
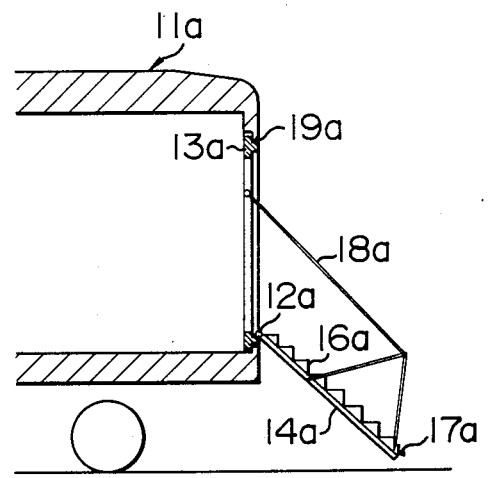

Next, a second embodiment of the invention will be described with reference to FIGS. 8 to 10. In FIG. 8, a hinged door portal frame 13a (one component) is installed on a car body 11a by means of a hinged structure 15a. A hinged door 14a (a second component) is installed on the inner side of the hinged door portal frame 13a, so that the hinged door 14a will swing open outwardly by means of a horizontal hinge 12a. In addition, stepping means herein shown as a staircase 16a is installed on the inner side of this hinged door 14, and the apparatus is arranged such that people will be able to walk on it safely when the hinged door 14a is swung open outwardly. A locking device 17a locks the hinged door portal frame 13a and the hinged door 14a.

When the car is located midway within the length of a train, the apparatus can be used as a through passage by inwardly opening the hinged door portal frame 13a together with the hinged door 14a. When the apparatus is used as an emergency exit at the head of a train, an emergency exit passage is formed as the rear surface of this hinged door 14a becomes a staircase 16a or a ramp by swinging open the hinged door 14a downwardly. At this juncture, safety can be further increased if a lifting rope 18a is connected between the door portal frame 13a and the hinged door 14a and is used as a railing. In addition, a sealing rubber 19a similar to the one mentioned above may be used as a means for preventing the entry of rain water or wind.

In the cases of both the first and second preferred embodiments, the hinged door described was an inwardly-opening type, but it is also possible to employ an outwardly-opening type to the extent that it will not cause any hindrance to the coupling operation. In this case, the means of the hinged door should not be confined to that described in the preferred embodiments, since it is also possible to employ such means as splitting the door into two sections or more like French doors or using a folded-door structure.

Since the present invention has the aforementioned arrangement, it is possible to make use of the respective advantages of the emergency doors of the conventional inwardly-opening, through-passage type and the outwardly opening type and to resolve the disadvantages thereof, as well as to render the functions of a through passage and an emergency exit apparatus compatible by means of one opening mechanism. Therefore, the apparatus according to the present invention possesses outstanding features since it can be used as a normal through passage when used midway within the length of a train and as a safe emergency exit to the track when used at the head of a train.

I claim:

1. An emergency exit apparatus for a train car comprising:
   a hinged door portal frame pivotally supported on a wall of the car on a horizontal hinge axis on a lower edge of said portal frame for pivoting open outwardly of the car,
   a hinged door pivotally supported on said portal frame on a vertical hinge axis on a side edge of said door for pivotal movement from a closed to an open position, and
   stepping means carried on a surface of said hinged door facing inwardly of the car to provide a ramp for emergency exit from the car upon said portal frame pivoting to an open position outwardly of the car.

* * * * *